United States Patent
Mondt

[11] 3,888,223
[45] June 10, 1975

[54] CARBURETOR ENRICHMENT SYSTEM

[75] Inventor: James R. Mondt, Pontiac, Mich.

[73] Assignee: General Motors Corporation, Detroit, Mich.

[22] Filed: Apr. 12, 1974

[21] Appl. No.: 460,507

[52] U.S. Cl. .............. 123/136; 123/127; 123/133; 123/179 G; 123/187.5 R
[51] Int. Cl.. F02m 17/08; F02b 77/00; F02n 17/00
[58] Field of Search............ 123/179 G, 180 R, 136, 123/127, 3, 133, 187.5 R

[56] References Cited
UNITED STATES PATENTS

| | | | |
|---|---|---|---|
| 1,051,122 | 1/1913 | Krayer | 123/127 X |
| 3,374,777 | 3/1968 | Walker | 123/136 |
| 3,763,839 | 10/1973 | Alquist | 123/136 |
| 3,827,417 | 8/1974 | Morita | 123/127 |
| 3,838,673 | 10/1974 | Csicsery et al. | 123/127 X |
| 3,844,264 | 10/1974 | Grawger | 123/136 |
| R26,169 | 3/1967 | Hall | 123/136 |

*Primary Examiner*—Charles J. Myhre
*Assistant Examiner*—Tony Argenbright
*Attorney, Agent, or Firm*—J. C. Evans

[57] ABSTRACT

An air fuel supply system for an internal combustion engine has a carburetor connected to the intake manifold of an engine with a plurality of large diameter vapor ports formed below the carburetor throttle. A vapor pump draws hydrocarbon vapors and air from the gas tank and from a fuel vapor evaporative control canister having a vent opening thereto and an inlet connected to a vent conduit from the top of the gas tank. The vapor pump is operated during cold engine start to direct a precharge of vaporized fuel and air through the unrestricted vapor ports into the intake manifold for improving cold start operation and emissions.

5 Claims, 3 Drawing Figures

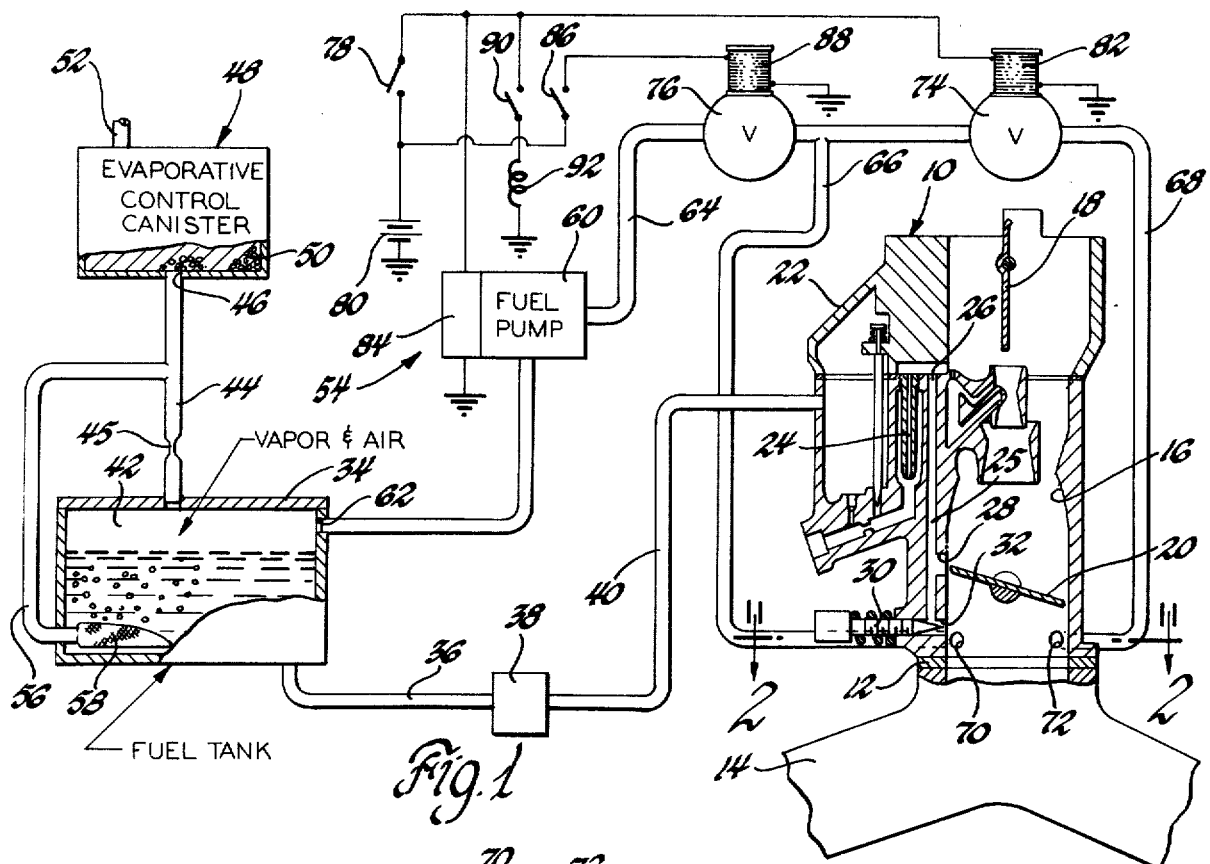
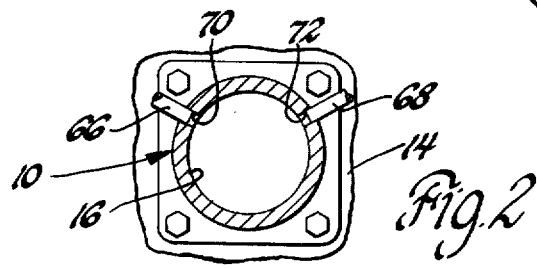
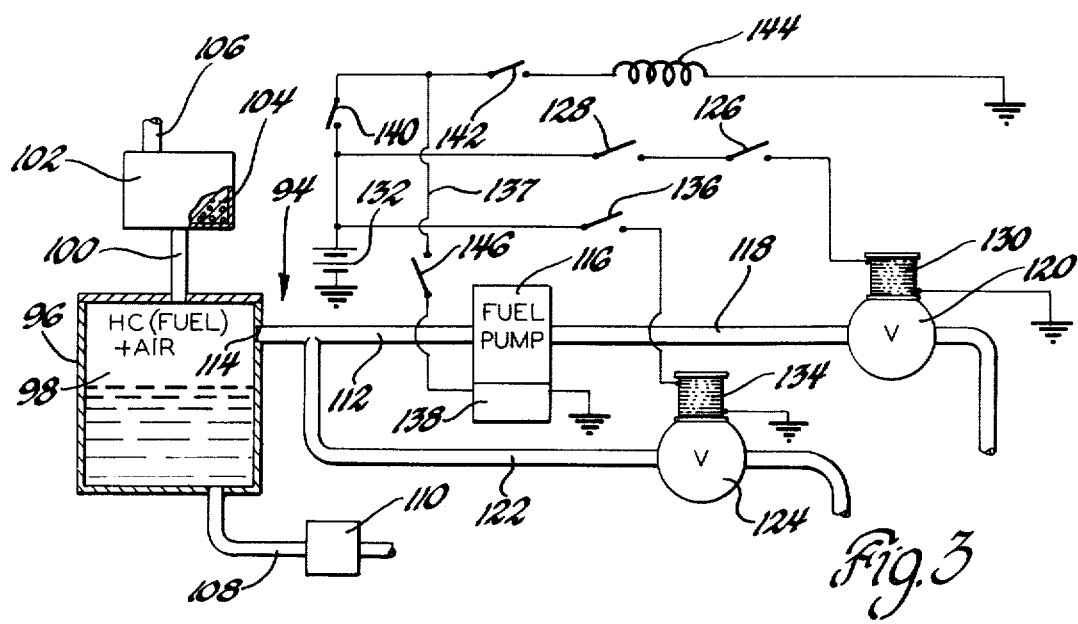

CARBURETOR ENRICHMENT SYSTEM

This invention relates to carburetion systems for internal combustion engines and more particularly to carburetors having means in association therewith to direct vaporized fuel and air to the engine at start to improve combustion therein.

In internal combustion engines carburetors are included to produce a mixture of air and fuel that is directed into the intake manifold of the vehicle and passed to engine cylinders for ignition therein.

Under cold engine start conditions, it is possible to direct a substantial quantity of liquid fuel into the combustion chambers of the engine with a resultant increase in emissions from the engine.

Various approaches have been used to reduce the problem of liquid fuel consumption during cold engine starts including the provision of heated manifold crossovers to vaporize fuel droplets prior to passage into the engine cylinders. It is also recognized that the injection of vapor or gaseous fuel components into the intake manifold will improve combustion under cold start conditions so as to reduce emissions.

An object of the present invention is to improve carburetion systems for internal combustion engines by the provision of means operative prior to the engine being started to direct air and fuel tank vapors and/or vapors from an evaporative control canister into the intake manifold to produce a precharge of gaseous or vaporized fuel air mixture in the intake manifold to effect better mixing and combustion of the fuel supply from a carburetor when the engine is started so as to reduce cold start engine emissions.

A further object of the present invention is to improve the cold start operating characteristics of an internal combustion engine having an air-fuel supply carburetor by the provision of means for withdrawing hydrocarbon vapor and air from a gasoline tank prior to engine start directly into the intake manifold of a vehicle and means for maintaining a supply of such hydrocarbon vapor and air flow into the intake manifold at an enriched level until engine ignition occurs and thereafter operative to maintain a reduced intermediate sustaining level of vapor flow into the intake manifold until the engine is warmed up; and thereafter terminating vapor air flow from the gasoline tank with fuel supply to the intake manifold then being maintained through the main carburetion system of the engine.

Yet another object of the present invention is to provide an improved gasoline vapor carburetor enrichment system for supplementing the fuel supply of a conventional internal combustion engine carburetor in which an electric motor driven vapor pump is connected in series with a vapor space of a gasoline tank and a vent conduit to a vented evaporative control canister for withdrawing hydrocarbon vapors and air therefrom for a prescribed time under the control of flow directing means including a first valve responsive to the ignition start switch for directing vapors through a first unrestricted port located between a throttle and the intake manifold and a second thermally responsive valve for directing flow of vapor from the pump through a second unrestricted port between the throttle and the intake manifold to direct vaporized fuel and air from the pump directly into the intake manifold prior to engine start to produce a precharge of vaporized fuel and air that improves engine combustion at cold start so as to reduce hydrocarbon and carbon monoxide emissions therefrom; and wherein the first valve means is operative in response to engine start to reduce the flow of vaporized fuel to an intermediate sustaining level which is maintained under the control of the thermally controlled valve responsive to a predetermined warm engine temperature to terminate flow of supplemental vaporized fuel components to the intake manifold with subsequent engine fuel supply being directed solely from the air and fuel components of a conventional carburetor.

Further objects and advantages of the present invention will be apparent from the following description, reference being had to the accompanying drawings wherein a preferred embodiment of the present invention is clearly shown.

In the Drawings

FIG. 1 is a diagrammatic view of the vapor enrichment system of the present invention in combination with a conventional carburetor for supplying engine fuel and air to the intake manifold of an internal combustion engine;

FIG. 2 is a horizontal cross sectional view taken along line 2—2 looking in the direction of the arrows; and FIG. 3 is a diagrammatic view of another embodiment of a two level enrichment control system in accordance with the present invention.

Referring now to the drawings, in FIG. 1 a carburetor 10 is shown which is representative of a conventional carburetor configuration suitable for association with the present invention. It is supported on a pad 12 of an internal combustion engine intake manifold 14 and operative to supply a predetermined air-fuel mixture to the engine under cold start engine conditions, idle conditions and various acceleration modes of operation.

More particularly, the carburetor 10 includes a bore 16 directed therethrough having an upper open end adapted to be connected to an air cleaner (now shown) and a lower end in direct communication with the intake manifold 14. An offset choke valve 18 is located in the upper end of the bore 16. It is adapted to be connected to a conventional thermostatically operated choke system that is present to locate the choke valve 18 slightly open when the engine is cold to reduce the amount of air flow through the bore 16. Under cold start conditions, a throttle valve 20 at the lower end of the bore 16 is initially maintained in an illustrated idle position. During this phase of operation, air is directed into the bore 16 across the partially closed choke valve 18 and fuel is directed from a fuel bowl 22 through an idle tube 24 thence into an idle channel 25 that has a top air bleed 26 thereto and a lower air bleed 28 thereto. Fuel and air are mixed in the channel 25 and thereafter directed across an idle mixture needle 30 to be discharged through an idle orifice 32 into the carburetor bore 16 below the partially closed throttle valve 20.

Under cold start conditions, when the carburetor is conditioned in the aforementioned mode, a richer air-fuel mixture is directed into the cold engine for start operation. Under this condition of operation, the fuel components directed into the bore 16 are difficult to vaporize and as a result will be directed toward the cylinders of the engine in a liquid form to produce substantial levels of carbon monoxide and hydrocarbon emissions during cold engine start and operation. Various proposals have been suggested to minimize such emission including the provision of a hot spot in the intake manifold immediately below the carburetor bore 16. Such hot spots function to vaporize fuel droplets collected thereon to reduce engine emissions during cold engine startup. The present invention obviates the need for such pre-vaporization.

In the system of the present invention, fuel for the carburetor 10 is directed from a gasoline tank 34 through a pipe 36 to the inlet of a fuel pump 38 that is connected to a fuel supply line 40 to the fuel bowl 22. The tank 34 is a conventional tank having a vapor air space 42 located thereabove. A vent conduit 44 from the vapor air space 42 with a restrictor 45 therein is connected to the inlet 46 of an evaporative control canister 48 having a suitable vapor adsorbent material 50 therein such as activated charcoal or silica gel for adsorbing hydrocarbon vapors that are generated within the tank 34. An atmospheric vent pipe 52 is connected to the canister for defining a reverse air flow purge path through the canister 48.

The hydrocarbon vapor and air in space 42 and vapors adsorbed by the active material 50 within the canister 48 serve as a source of vaporized fuel for use in a cold start carburetor enrichment system 54. Mass transfer of gasoline hydrocarbons and air through the tank space 42 assures that some hydrocarbon fuel is mixed with the air from this supply at all times. By drawing make-up air through vent 52 of the canister 48, hydrocarbons are purged from the canister 48 first. When the canister is depleted more hydrocarbon fuel vapors can be extracted from the space 42 to assure a stable mixture of vaporized hydrocarbons and air. Improved mass transfer of vapor for this purpose can be obtained in the tank 34 if make-up air is in part directed through a bypass pipe 56 from conduit 44. Pipe 56 connects to a large surface area porous screen 58 in the liquid fuel within tank 34 to bubble make-up air through the liquid fuel during vapor withdrawal for assured vapor supply. The system includes an electric motor driven vapor pump 60 having an inlet in communication with a port 62 from the vapor and air space 42, to produce purge of canister 48 and make-up air flow through screen 58. An outlet of the vapor pump 56 is connected by a vapor supply conduit 64 to a pair of parallel conduits 66, 68 connected respectively to unrestricted vapor ports 70, 72 directed through the sidewall of the carburetor bore 16 below the throttle valve 20 therein. The ports 70, 72 define an inlet for flow of vapors and air into the intake manifold under a two level enrichment mode of operating as established by a solenoid operated control valve 74 that regulates vapor flow through the conduit 68 and port 72 in accordance with engine startup and a second thermally controlled valve 76 that controls flow through the conduit 66 and port 70 in accordance with the engine temperature.

Under cold start, when an ignition start switch 78 is closed, power is directed from battery 80 to the solenoid coil 82 of valve 74, and to an electric motor 84 of the vapor pump 60. Concurrently, thermal switch 86 senses cold engine temperatures to close and complete a circuit to coil 88 of valve 76. Accordingly, both valves 74, 76 are open and the vapor pump 60 will draw vaporized fuel and air components from the space 42 and from the canister 48. Backflow through the vent 52 will purge the vapors previously collected in the active material of the canister 48 and will also withdraw vapor from the space 42 and discharge it through both the conduits 66, 68 for passage through the unrestricted ports 70, 72 in the carburetor bore 16 below the substantially closed idle positioned throttle valve 20.

When the start switch 78 is initially engaged, a time delay switch 90 in the circuit to start motor 92 is open. Thus the intake manifold is precharged with vaporized air-fuel from tank 34 before the starter is engaged. After the time delay engine cranking commences and air and fuel from carburetor 10 will be thoroughly mixed within the vapor component produced by the carburetor vapor enrichment system 54 so as to produce an easily ignited combustion charge in the engine cylinders.

When the engine starts and the start switch 78 is disengaged, the solenoid operated valve 74 closes to terminate flow of vapors through the port 72 and motor 84 is deenergized. A reduced intermediate sustaining level of vapors will be maintained through the conduit 66 and the port 70 under the control of valve 76. Pump 60 is designed so that manifold vacuum following engine start will draw additional vapors through the pump until valve 76 is closed. As soon as the engine temperature has increased to a point at which liquid components from the carburetor 10 will be vaporized as they pass through the intake manifold, switch 86 opens and the solenoid operated control valve 76 will close to block communication between the vapor source and the intake manifold.

The embodiment of FIG. 3 shows a vapor enrichment system having a two level enrichment control with a vaporized fuel and air supply 94 including a gas tank 96 having a hydrocarbon fuel vapor and air space 98 located thereabove connected to a vent conduit 100 that is in series connection with an evaporative control canister 102 having vapor adsorbing material 104 therein. The evaporative canister 102 further includes a purge vent 106.

In this embodiment of the invention a fuel supply line 108 is in communication with the tank 96 and with a pump 110 to direct liquid fuel to a vehicle carburetor like that illustrated in the first embodiment.

The system includes a first vapor supply pipe 112 in communication with a vapor port 114 in the tank 94 and with the inlet of an electric motor driven vapor pump 116 that has the outlet thereof connected by a conduit 118 to a vapor supply port in a carburetor of the type shown at reference numeral 72 in the embodiment of FIGS. 1 and 2. Vapor flow through the conduit 118 is under the control of a solenoid operated valve 120. The system further includes a second vapor supply conduit 122 in communication with the pipe 112 in parallel, bypassed relationship to the pump 116. It is adapted to be connected to a second vapor supply port corresponding to port 70 in the first embodiment and is under the control of a solenoid operated valve 124. In this embodiment of the invention, the solenoid valve 120 is energized to communicate the vapor space 98 with one vapor supply port of the carburetor under the control of an ignition switch 126 in series connection with a thermally responsive switch 128 that is operated in accordance with engine inlet manifold temperature. When the switches 126, 128 are closed, the coil 130 of the valve 120 is connected to a power source represented by a battery 132. The energization circuit for the coil 134 of the valve 124 is under the control of a thermally responsive switch 136 that is normally opened and closed when the manifold temperature is less than a predetermined temperature.

Additionally, the control circuit for the system includes a conductor 137 connected between the power source and an electric drive motor 138 for the pump 116 that is under the control of a switch 140, positioned closed when the ignition switch is on. Additionally, the circuit includes a time control switch 142 that is operative to delay energization of the engine cranking motor 144. Thus, when the ignition key is first turned on, the switches 126, 140 are closed and the motor 138 of the vapor pump 116 is energized. The valves 120, 124 are conditioned opened so that a precharge of vapor and air is directed from space 98 and canister 102 through the conduits 118, 122 into the intake manifold of the vehicle. Following the delay period, engine cranking operation occurs and the vaporized fuel air precharge in the intake manifold will mix with the fuel air supply from the carburetor to produce improved combustion in the cylinders with a resultant reduction in engine emissions during cold start.

Following engine ignition, switch 140 and switch 126 are conditioned opened so as to de-energize the valve 120 and the vapor pump 138. Continued engine operation will produce a reduced vacuum in the intake manifold that will continue to draw a sustaining, reduced flow of vaporized hydrocarbons and air from the space 98 through the conduit 122. When the manifold temperature reaches a predetermined temperature at which fuel droplets from a conventional carburetor will be vaporized, the switch 136 will open to close valve 124 thereby to terminate communication between the vaporized hydrocarbon and fuel-air supply and the carburetor.

Under a cool start condition and cool running operation, the aforesaid system is operative to produce a reduced vapor charge at engine start. For example, in operational modes wherein the engine intake manifold temperature is greater than 80° and less than 90°F., a vapor flow through both the conduits 118, 122 into the intake manifold might produce an excessive enrichment of the fuel supply thereto. Thus, in the present invention, when this intermediate operating mode occurs, the switch 128 will be opened so as to maintain the valve 120 closed. The vapor pump 116 will be energized for the time delay period mentioned above and the switch 136 remains closed to cause solenoid valve 124 to be conditoned open so that the intermediate sustaining flow of vaporized hydrocarbons and air will be directed into the intake manifold to produce a reduced volume precharge of vaporized fuel and air therein which will reduce emissions under the cool start/cool running operation conditions without undesirable fuel enrichment.

The system is further conditioned under a warm start and warm running operation where the manifold temperature is greater than 90°F. to prevent vapor flow into the carburetor from the tank space 98. Under this mode of operation, the manifold temperature responsive switches 128, 136 are both conditioned open and the energization circuit for the motor 138 will also be conditioned open by a temperature responsive switch 146 in conductor 137.

For very cold start conditions, (for example below 40°F. manifold temperatures) the manual choke to the carburetor will be operable to produce reliable starting operation because of possible variable supply of pre vaporized fuel in the vapor space 98 of the tank. A requirement for fast idle operation of the throttle can be accomplished with a conventional thermostatic choke controller with an idle cam thereon similar to current practive in automatic choke systems.

While the embodiments of the present invention, as herein disclosed, constitute a preferred form, it is to be understood that other forms might be adopted.

What is claimed is:

1. A gasoline vapor carburetor enrichment system for association with a carburetor having a bore therethrough with one open end adapted to be connected to an air cleaner and an opposite open end adapted to supply an air-fuel mixture to the intake manifold of a vehicle and including a throttle valve located above the intake manifold for regulating air-fuel flow into the intake manifold comprising: a plurality of vapor ports in said carburetor bore below said throttle plate, a gasoline tank having a vapor space therein and a vent conduit therefrom, a canister including means for adsorbing fule vapors, said canister including an atmospheric vent and an inlet in communication with said vent conduit to receive fuel vapors from the tank and to adsorb said vapors within said canister, means for withdrawing vapors from said tank and said canister for a predetermined time prior to engine cranking for discharge through said plurality of vapor ports under engine start conditions to produce a precharge of vaporized fuel and air in the intake manifold to improve engine ignition under cold start conditions, said means for withdrawing vapors from said tank and said canister for discharge through said ports being operative to reduce the flow of vapor and air to said ports upon engine ignition, and means responsive to a predetermined increase in engine temperature to terminate flow of vapors from said gasoline tank and said evaporated canister to said ports.

2. An engine air-fuel supply system comprising a carburetor having a bore including a thermostatically controlled choke valve at the upper open end thereof and a mechanically actuated throttle valve at the lower end thereof, a venturi section between said choke valve and said throttle valve in said bore, a fuel bowl in said carburetor, an idle jet located within said bore below said throttle valve means for communicating said fuel bowl with said bore to direct air-fuel mixture to said idle jet, means for directing a main air-fuel supply to said venturi section when said choke valve and throttle valves are opened, a pair of unrestricted vapor ports in said bore below said throttle valve, a source of vaporized fuel and air, flow control means for communicating said vapor ports with said source of vapor and air prior to engine cranking to direct a precharge of vaporized fuel and air into the intake manifold of an engine prior to engine start, means operative to reduce vapor flow through said ports on engine ignition during periods when the choke valve is closed and the throttle valve is in an idle position for improving combustion in the engine under cold start conditions, and means responsive to a predetermined increase in engine temperature operation to terminate flow of vaporized fuel into said carburetor bore.

3. An engine air-fuel supply system comprising a carburetor having a bore including a thermostatically controlled choke valve at the upper open end thereof and a mechanically actuated throttle valve at the lower end thereof, a venturi section between said choke valve and said throttle valve in said bore, a fuel bowl in said carburetor, an idle jet located within said bore below said throttle valve means for communicating said fuel bowl with said bore to direct air-fuel mixture to said idle jet, means for directing main air-fuel supply to said venturi section when said choke valve and throttle valves are opened, a pair of unrestricted vapor ports in said bore below said throttle valve, a source of vaporized fuel and air, flow control means for communicating said vapor ports with said source of vapor and air prior to engine cranking to direct a precharge of vaporized fuel-air charge into the intake manifold of an engine prior to engine start, said source including a gasoline tank having a vapor space therein, a vapor adsorbing canister having a vent opening thereto and an inlet fitting, and means for communicating the vapor space of said tank with the canister inlet to cause vapor generated from said tank to be adsorbed therein, said flow control means including a vapor pump for withdrawing gasoline vapors from said tank and said canister so as to purge vapors from said canister during an engine start phase of operation, and control valve means for directing vapor from said pump prior to engine cranking to produce the precharge of vaporized fuel and air in the intake manifold, and circuit means for conditioning said valve means to reduce vapor flow upon engine ignition, and means for conditioning said valve means to completely terminate flow of vapors into said bore when the engine reaches a predetermined operating temperature.

4. An engine air-fuel supply system comprising a carburetor having a bore including a thermostatically controlled choke valve at the upper open end thereof and a mechanically actuated throttle valve at the lower end thereof, a venturi section between said choke valve and said throttle valve in said bore, a fuel bowl in said carburetor, an idle jet located within said bore below said throttle valve means for communicating said fuel bowl with said bore to direct air-fuel mixture to said idle jet, means for directing a main air-fuel supply to said venturi section when said choke valve and throttle valves are opened, a pair of unrestricted vapor ports in said bore below said throttle valve, a source of vaporized fuel and air, flow control means for communicating said vapor ports with said source of vapor and air prior to engine cranking to direct a precharge of vaporized fuel-air charge into the intake manifold of an engine prior to engine start, said flow control means including a first conduit in communication with one of said vapor ports and first valve means responsive to engine ignition to terminate vapor flow through said conduit when engine ignition occurs, said flow control means further including a second conduit under the control of a second thermally responsive valve means responsive to a predetermined increase in engine temperature to terminate flow of vapor through the other of said ports to terminate flow of vapor and air from said source when the engine is warmed-up.

5. An engine air-fuel supply system comprising a carburetor having a bore including a thermostatically controlled choke valve at the upper open end thereof and a mechanically actuated throttle valve at the lower end thereof, a venturi section between said choke valve and said throttle valve in said bore, a fuel bowl in said carburetor, an idle jet located within said bore below said throttle valve means for communicating said fuel bowl with said bore to direct air-fuel mixture to said idle jet, means for directing a main air-fuel supply to said venturi section when said choke valve and throttle valves are opened, a pair of unrestricted vapor ports in said bore below said throttle valve, a source of vaporized fuel and air, flow control means for communicating said vapor ports with said source of vapor and air prior to engine cranking to direct a precharge of vaporized fuel-air charge into the intake manifold of an engine prior to engine start, said flow control means including a first conduit in communication with one of said vapor ports and first valve means responsive to engine ignition to terminate vapor flow through said conduit when engine ignition occurs, said flow control means further including a second conduit under the control of a second thermally responsive valve means responsive to a predetermined increase in engine temperature to terminate flow of vapor through the other of said ports to terminate flow of vapor and air from said source when the engine is warmed-up, and means operating said first valve means and responsive to an intermediate engine temperature condition to block flow of vapor through said first conduit during an intermediate temperature engine start operation, said second valve means being operative to maintain a reduced flow of vapors to the carburetor to produce an intermediate vapor enrichment of air-fuel supply to the intake manifold so as to improve engine combustion at the intermediate engine start temperature condition.

* * * * *